United States Patent
Yanagita et al.

(10) Patent No.: US 9,063,535 B2
(45) Date of Patent: Jun. 23, 2015

(54) NUMERICAL CONTROL PROGRAM EXECUTION BY ROBOT

(71) Applicant: Fanuc Robotics America Corporation, Rochester Hills, MI (US)

(72) Inventors: Akihiro Yanagita, Orion Township, MI (US); Eric Lee, Bloomfield Hills, MI (US); H. Dean McGee, Rochester Hills, MI (US); Jason Tsai, Bloomfield Hills, MI (US)

(73) Assignee: Fanuc Robotics America Corporation, Rochester Hills, MI (US)

( * ) Notice: Subject to any disclaimer, the term of this patent is extended or adjusted under 35 U.S.C. 154(b) by 163 days.

(21) Appl. No.: 13/723,408

(22) Filed: Dec. 21, 2012

(65) Prior Publication Data
US 2013/0166068 A1  Jun. 27, 2013

Related U.S. Application Data

(60) Provisional application No. 61/579,288, filed on Dec. 22, 2011.

(51) Int. Cl.
*G06F 19/00* (2011.01)
*G05B 19/408* (2006.01)

(52) U.S. Cl.
CPC .......... *G05B 19/4083* (2013.01); *G05B 19/408* (2013.01); *G05B 2219/35252* (2013.01); *G05B 2219/36232* (2013.01)

(58) Field of Classification Search
CPC combination set(s) only.
See application file for complete search history.

(56) References Cited

U.S. PATENT DOCUMENTS

| | | | | |
|---|---|---|---|---|
| 4,199,814 A | * | 4/1980 | Rapp et al. | 700/180 |
| 4,396,973 A | * | 8/1983 | Imazeki et al. | 700/7 |
| 4,415,965 A | * | 11/1983 | Imazeki et al. | 700/7 |
| 4,499,341 A | | 2/1985 | Boyd | |
| 4,549,276 A | * | 10/1985 | Inaba et al. | 700/253 |
| 4,835,730 A | | 5/1989 | Shimano et al. | |
| 4,956,765 A | * | 9/1990 | Iwagaya | 700/87 |
| 4,956,785 A | * | 9/1990 | Kawamura et al. | 700/159 |
| 5,072,398 A | * | 12/1991 | Seki et al. | 700/183 |
| 5,163,171 A | * | 11/1992 | Seki et al. | 318/570 |
| 5,578,913 A | | 11/1996 | Yasuda et al. | |
| 5,828,574 A | | 10/1998 | Robinson et al. | |
| 6,266,572 B1 | | 7/2001 | Yamazaki et al. | |
| 6,658,316 B1 | * | 12/2003 | Mehta et al. | 700/182 |
| 6,685,868 B2 | * | 2/2004 | Costin | 264/400 |
| 7,203,568 B2 | | 4/2007 | Genma et al. | |
| 7,949,422 B1 | * | 5/2011 | Little et al. | 700/180 |
| 8,185,238 B2 | * | 5/2012 | Gonzalez Sainz et al. | 700/245 |
| 2008/0281462 A1 | * | 11/2008 | Suh et al. | 700/181 |
| 2008/0281463 A1 | * | 11/2008 | Suh et al. | 700/182 |
| 2009/0326892 A1 | | 12/2009 | Lin | |

(Continued)

*Primary Examiner* — Jonathan L Sample
(74) *Attorney, Agent, or Firm* — Fraser Clemens Martin & Miller LLC; William J. Clemens

(57) ABSTRACT

A system and a method for converting a machine tool program in NC programming language to permit a robot controller to execute the program. A robot controller converts the NC program into robot language according to a conversion configuration table, and uses the converted language as pseudo program data internally stored in a data memory within the robot controller. Each M-code (Miscellaneous code) in the NC program is executed as a sub-program call using the robot language. The content of the sub-programs can be freely defined and programmed by the user and, therefore, can be customized for the specific application.

20 Claims, 7 Drawing Sheets

(56) References Cited

U.S. PATENT DOCUMENTS

| | | | |
|---|---|---|---|
| 2009/0327511 A1* | 12/2009 | Kim et al. | 709/232 |
| 2010/0131081 A1* | 5/2010 | Brown et al. | 700/21 |
| 2010/0161094 A1* | 6/2010 | Crothers | 700/98 |
| 2010/0161100 A1* | 6/2010 | Crothers et al. | 700/105 |
| 2011/0185371 A1* | 7/2011 | Brown et al. | 719/328 |

* cited by examiner

NUMERICAL CONTROL PROGRAM EXECUTION BY ROBOT

CROSS-REFERENCE TO RELATED APPLICATION

This application claims the benefit of U.S. provisional patent application Ser. No. 61/579,288 filed Dec. 22, 2011.

FIELD OF THE INVENTION

This invention relates to the operation of machine tools by robots executing numerical control programs.

BACKGROUND OF THE INVENTION

It is known to automatically operate machine tools by a "numerical control" (NC) method utilizing a programmed digital computer or a programmable logic controller (PLC) connected to the machine tool to form a computer numerical control (CNC) machine tool. A user program (part program) is provided in an NC programming language (G-code program) to operate the CNC machine tool to perform a manufacturing process. The programming is typically done in standards-based programming languages such as FBD (Function Block Diagram), LD (Ladder Diagram), ST (Structured Text, similar to Pascal programming language), IL (Instruction List, similar to assembly language), and SFC (Sequential Function Chart). However, differences in I/O addressing, memory organization and instruction sets mean that the programs are never perfectly interchangeable between different machine tool makers.

It is also known to operate machine tools by a robot. Typically, robots are controlled by computers executing software programs proprietary to the robot manufacturer. The differences between the NC programming languages and the robot programming languages prevent the robot controllers from executing an NC language program written for a CNC machine tool.

Typically, a CNC machine tool requires a more costly mechanical structure than a robot machine tool to achieve the desired functionality. For many machine tool applications, users demand NC programming language to program the machine tools since the NC languages have been traditionally used. Unfortunately robots cannot be used in such markets because robot controllers cannot interpret and execute the commands in such NC programs. On the other hand, NC controllers are not readily able to control robots due to the special nature of robot control (such as complex kinematics arithmetic, etc.).

There are some offline conversion systems that can create a robot program from an NC program. However, such conversion system generally only convert the motions of the mechanical structure, but are not able to convert the "M-code" (Miscellaneous code) to take care of machine specific application processing. Because M-codes are defined by the user (machine tool builder) for the specific machine tool they build, the robot controller will not be able to execute an M-code without the knowledge of how it should be processed.

SUMMARY OF THE INVENTION

According to the present invention, with the use of robot arms, a machine can be made with a less expensive mechanical structure. Utilizing the following method, the robot controller can execute a part program written in the NC programming language.

Step 1) The robot controller converts the NC program into robot language, and uses it as the pseudo program data internally stored in the data memory system within the robot controller.

Step 2) Each M-code (Miscellaneous code) is executed as a sub-program call using the robot language. The content of the sub-programs can be freely defined and programmed by the user (system integrator) and, therefore, can be customized for the specific application.

Step 3) Some M-codes are attached to a motion, where the M-code is executed at the timing the motion has completed. In such cases, the robot controller calls the corresponding sub-program in the robot language when the motion has completed.

Step 4) An I/O interface must be able to select and run a program, and monitor the status of the program running. Because the line number has one-to-one correspondence between the original NC program and the pseudo robot program, it makes it easy to create a user interface to show the program line currently being executed.

The method for controlling a robot comprises the steps of: storing a numerical control language program in a mass storage device connected to a central processing unit, the numerical control language program adapted to be executed by a computer numerical control machine tool to perform a manufacturing process; operating the central processing unit to convert the numerical control language program into a robot language program based upon a pre-defined conversion configuration table having discrete configuration instructions for converting each numerical control language positional command to a robot language positional command and converting each numerical control language miscellaneous code command to a robot language sub-program; storing the robot language positional commands and the robot language sub-programs as the robot language program in the mass storage device; and executing the robot language program with a robot controller connected to the mass storage device and the robot at a run-time of the robot to perform the manufacturing process.

DESCRIPTION OF THE DRAWINGS

The above as well as other advantages of the present invention will become readily apparent to those skilled in the art from the following detailed description of a preferred embodiment when considered in the light of the accompanying drawings in which.

DETAILED DESCRIPTION OF THE INVENTION

The following detailed description and appended drawings describe and illustrate various exemplary embodiments of the invention. The description and drawings serve to enable one skilled in the art to make and use the invention, and are not intended to limit the scope of the invention in any manner. In respect of the methods disclosed, the steps presented are exemplary in nature, and thus, the order of the steps is not necessary or critical.

The U.S. provisional patent application Ser. No. 61/579,288 filed Dec. 22, 2011 is incorporated herein by reference.

Figure 1:
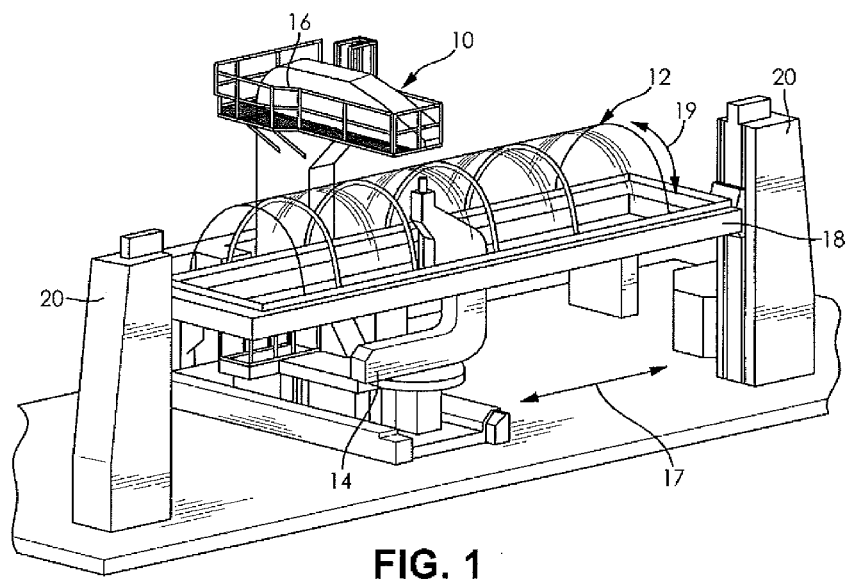
FIG. 1 is a perspective view of a prior art CNC machine tool utilizing an NC program for performing welds on a section of an aircraft fuselage.

CNC machine tools are utilized to perform a wide variety of manufacturing processes including assembly operations. For example, there is shown in FIG. 1 a CNC machine tool 10 for assembling a portion 12 of an aircraft fuselage. The fuselage portion 12 is semi-circular in cross section and is formed from a plurality of skin sheets or panels attached to a grid of arcuate frames and straight stringers, typically by riveting, welding or adhesive bonding. The machine tool 10 has a pair of arms 14, 16 positioned on the inside and outside respectively of the fuselage portion 12. The tool 10 is movable along an "X" axis 17 parallel to a longitudinal axis of the fuselage portion 12 to attach the skin panels at any selected position along one of the stringers extending between opposite ends of the fuselage portion 12. The fuselage portion 12 is supported by a frame 18 that is rotatable in a direction 19 about a horizontal axis. The frame 18 is mounted between a pair of stanchions 20. Thus, the fuselage portion 12 and the frame 18 can rotate about the horizontal axis to permit the tool 10 move between stringers and to attach the skin panels along any of the frames. However, the CNC machine tool 10 requires a large and expensive structure that can support and rotate the fuselage portion 12 in order to perform the necessary skin attachment operations.

Figure 2:
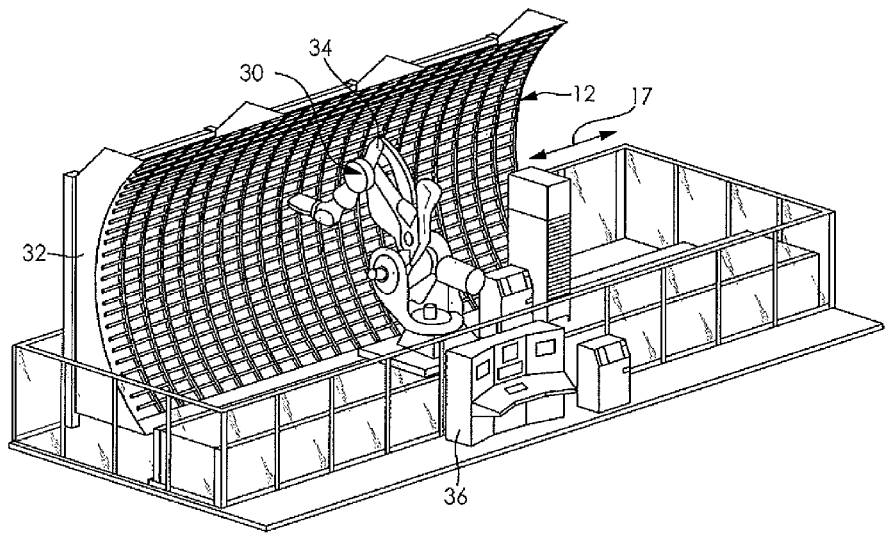
FIG. 2 is a perspective view of a robot controlled machine tool for performing welds on the section of the aircraft fuselage shown in FIG. 1.

In FIG. 2, the CNC machine tool 10 of FIG. 1 is replaced by a robot 30 to perform the same skin attachment operation. The fuselage portion 12 is attached to a fixture 32 in a generally vertical orientation facing the robot 30. The robot 30 can move along the fixture in the movement direction 17 parallel to the longitudinal axis of the fuselage portion 12. Further, an arm 34 of the robot 30 is articulated to move along the fuselage portion 12 in an arcuate path along the arcuate frames and between the stringers. Thus, the robot controlled machine tool 30 can be implemented as a smaller and less expensive structure as an alternative to the CNC machine tool 10.

Figure 3:
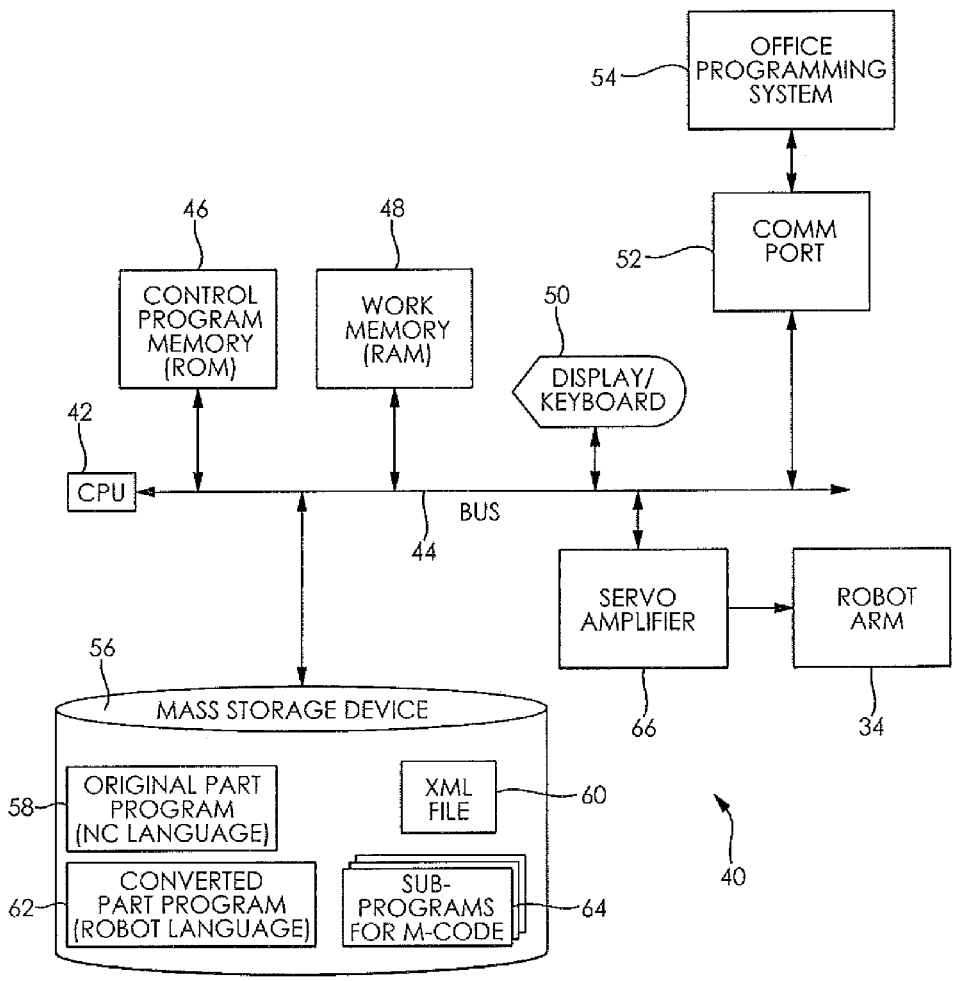
FIG. 3 is a block diagram of the control system of the robot shown in FIG. 2.

However, as explained above, users of the CNC machine tool 10 are reluctant to switch to the robot controlled machine tool 30 because a robot control 36 cannot execute the NC programming language utilized by the CNC machine tool 10. According to the present invention, a system 40 for converting NC programming language into robot programming language is shown in FIG. 3 in block diagram format. A CPU (Central Processing Unit) 42 has access to each device of the system via a bus line 44. The CPU 42 operates according to a control program that is stored in a Control Program Memory (ROM) 46, which is a non-volatile memory connected to the bus 44.

A Work Memory (RAM) 48, connected to the bus 44, is a memory system that provides the work area for the system 40 to do the processing. A Display and Keyboard 50 is connected to the bus 44 to enable an operator to interact with the system 40. The system is connected via a Communication Port 52 and the bus 44 to an offline programming system 54 connected to the port 52. The user or operator creates the "part program" in NC programming language on the offline programming system 54. The NC program is then downloaded to the system 40 via the communication port 52, and copied to a mass storage device 56 using an established method (such as File Transfer Protocol, etc.). The mass storage device 56 is connected to the bus 44 and provides a place to store an original part program (in NC language) 58, an XML (Extensible Markup Language) file 60 of the part program, a converted part program (in robot language) 62, and sub-programs for M-codes 64. The robot arm 34 is driven by a servo amplifier 66, connected to the bus 44, based on the motion commands in the robot program 62.

Program conversion from the NC programming language to the robot programming language is based on a conversion configuration data table that is derived from the XML file 60. The table defines the language elements of the NC program 58. This table can even re-define the language differently from the language that is typically used. Some of the components of the table are:

Two letter Command—whether two letter commands are allowed (default: yes)

X-prefix—The prefix character for the X positional data (default: X)

X-suffix—The suffix character for X positional data (default: <none>)

Config-prefix—The prefix character for the config string (default: O)

F-prefix—The prefix character for Feed rate value (default: F)

Misc-prefix—List of miscellaneous codes, and their handling (default: M)

Joint motype—M-code value for specifying joint motype (default: <none>)

Uframe num—M-code value for specifying user frame number (default: <none>) Etc.

The program conversion takes place in two stages of processing as follows: 1) At power up the system 40 reads the XML file 60, and sets up the conversion configuration table in the work memory RAM 48; and 2) At each program conversion the system 40 converts the original NC program 58 into the internal robot program 62 according to the conversion configuration table.

Each element of the NC part program 58 is one alphabet letter. This step will define the meaning of each program element in the NC program 58, based on the XML file 60. This conversion table is necessary, because the meaning of the element may be different from the typical definition used in general. In other words, C-code, for example, may have a different meaning from what C-code typically means in the NC program language 58.

In this step, the system 40 reads the XML file 60, and creates the conversion configuration table according to the XML attributes in the file. The conversion configuration table contains the rule for the conversion. For example, the letter to be used for the "X" component of the positional data is defined in this table. The table is stored in the work memory RAM 48, and stays until the system 40 is shut down, or until the new XML file is loaded.

Figure 4:
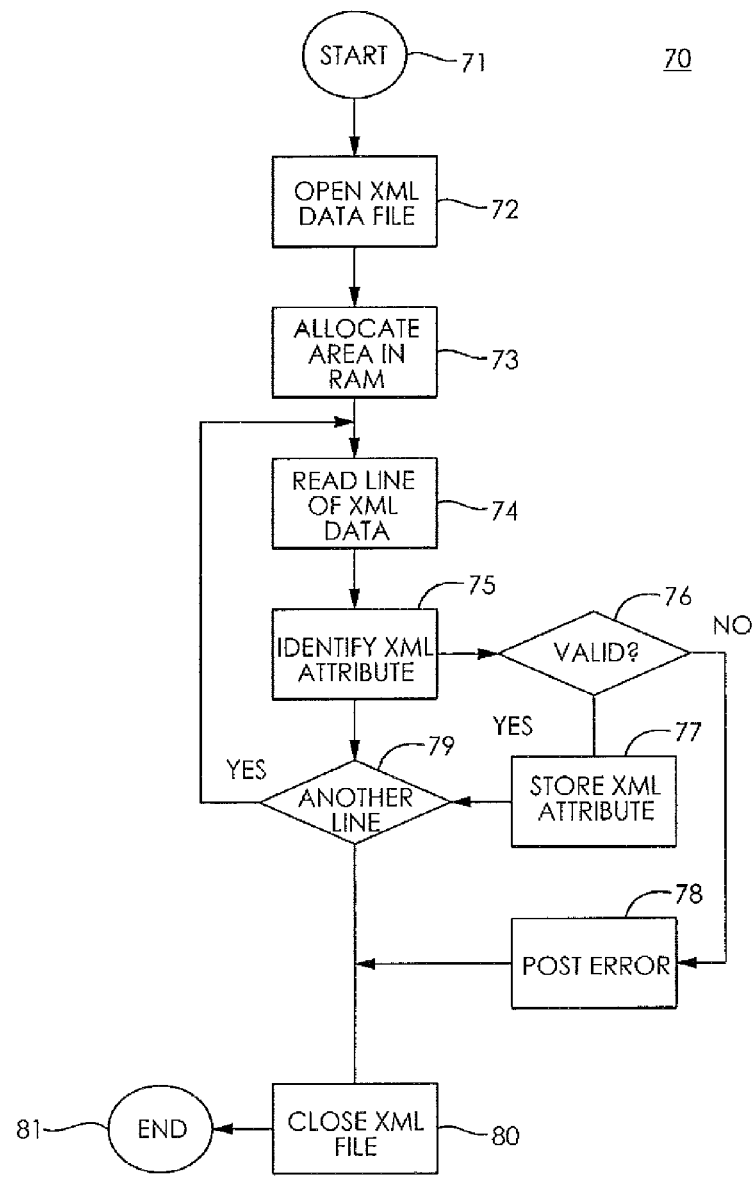
FIG. 4 is a flow diagram of a first stage of program conversion from NC programming language to the robot programming language at power up.

Therefore, this process is typically done once after the power-up. The Flow Chart 70 of this processing method is shown in FIG. 4 and includes the following steps:

Step 71—Start

Step 72—Open the XML data file 60

Step 73—Allocate an area for the conversion configuration table in the RAM 48

Step 74—Read one line of XML data

Step 75—Identify the XML attribute for the line

Decision Point 76—"Valid?" If it is a valid XML attribute, branch at "Yes" to Step 77 and if not branch at "No" to Step 78

Step 77—Store XML attribute in the conversion configuration table

Figure 5:
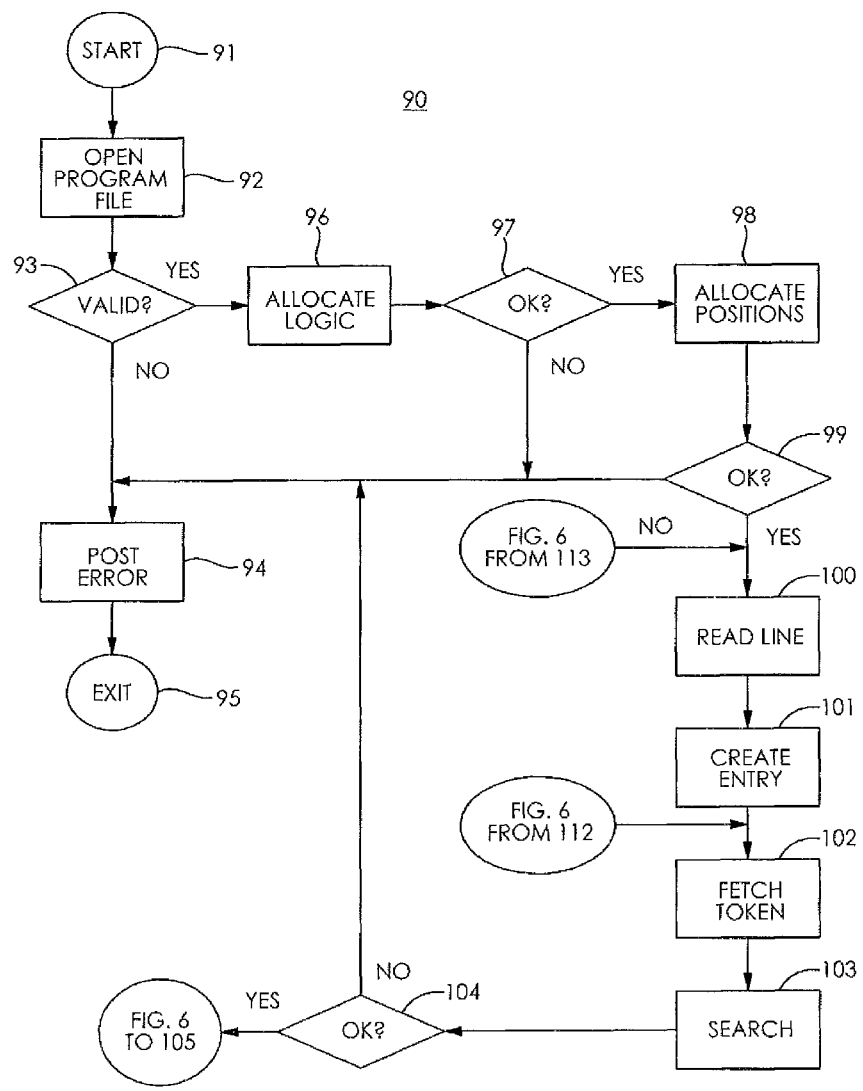
FIGS. 5-7 are a flow diagram of a second stage of the program conversion at each program conversion for converting the original NC program into the internal robot program.
Figure 6:
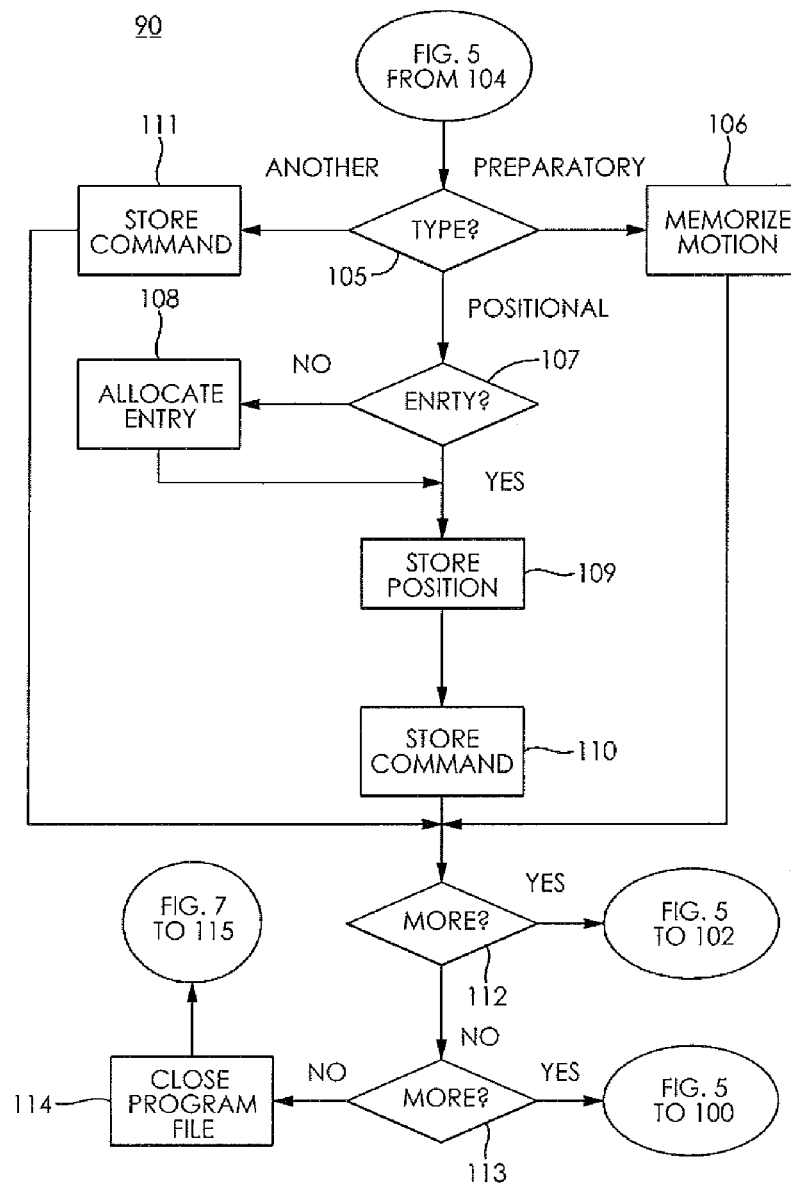
Figure 7:
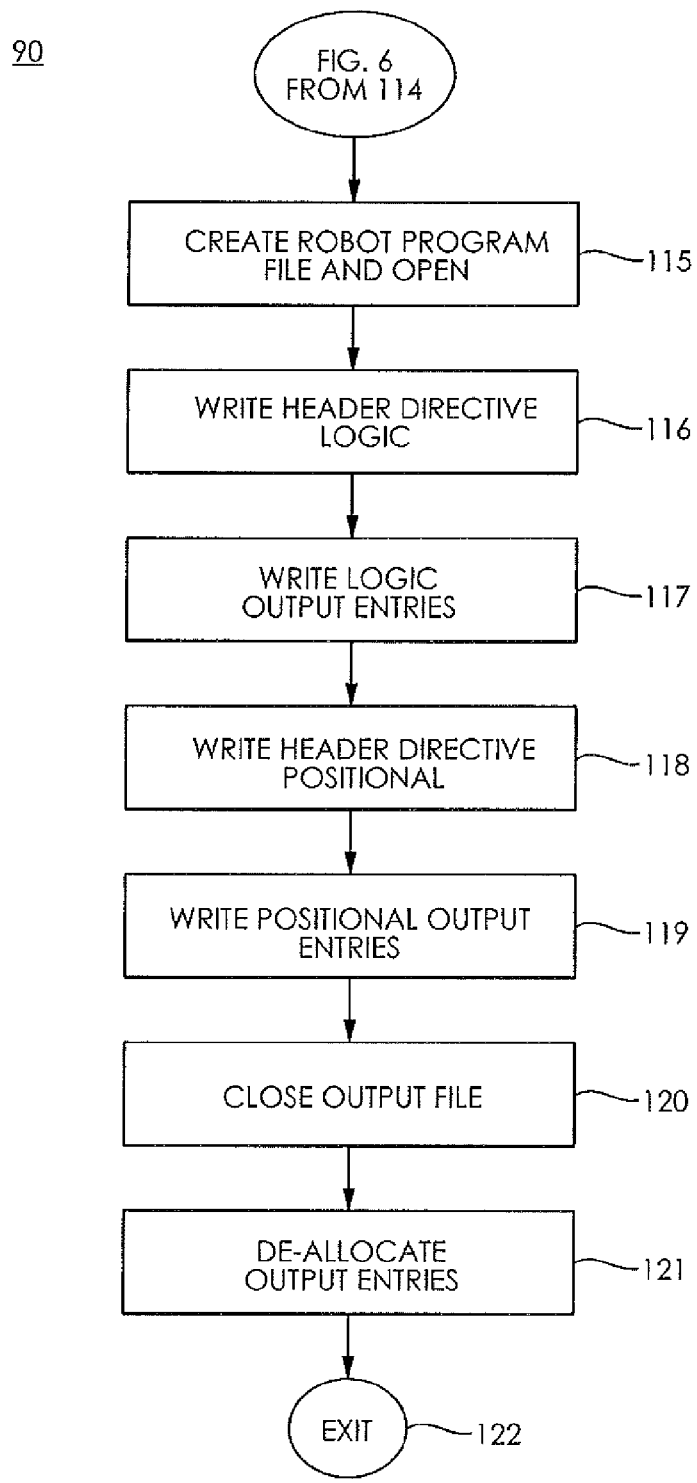

Step 78—Post an error, and abort the processing through Step 80 at Step 81
Decision Point 79—If there is another line, branch at "Yes" and return to Step 74 and if there are no more lines, branch at "No" to Step 80
Step 80—Close the XML file
Step 81—End The system 40 converts the original NC program 58 into the internal robot program 62 according to the conversion configuration table. The actual processing to convert the given NC part program (user program) 58 into the robot program 62 is shown in the FIGS. 5-7 as a flow chart 90 having the following steps:

Step 91—Start
Step 92—Open the Original NC program file 58
Decision Point 93—If opening not successful, branch at "No" to Step 94; if successful, branch at "Yes" to Step 96
Step 94—Post an error
Step 95—Exit
Step 96—Allocate the output area for logic statements
Decision Point 97—If allocation not successful, branch at "No", post an error in Step 94 and exit at Step 95; if successful, branch at "Yes" to Step 98
Step 98—Allocate the output area for positions
Decision Point 99—If allocation not successful, branch at "No", post an error in Step 94, and exit at Step 95; if successful, branch at "Yes" to Step 100
Step 100—Read one command line from the NC program file 58
Step 101—Create an entry in the logic output area
Step 102—From the command line, fetch one token, and the argument (numerical or string) that follows the token
Step 103—Search for the token letter in the conversion configuration table, and determine the type of command based on the table data
Decision Point 104—If the token letter is not found in the table, branch at "No", post an error in Step 94, and exit at Step 95; if the token letter is found, branch at "Yes" to Decision Point 105
Decision Point 105—If the command is the "preparatory" type command (typically it is a "G" code), branch to Step 106; if the command is one of the "positional" type commands (X, Y, Z, W, P, R, E or C), branch to Decision Point 107; if the command is "another" valid command based on the conversion configuration table, branch to Step 111
Step 106—Memorize the motion characteristics based on the command argument and go to Decision Point 112
Decision Point 107—If an entry in the positional output area does not exist, branch at "No" to Step 108; if the entry exists, branch at "Yes" to Step 109
Step 108—Allocate an entry in the positional output area
Step 109—Store the positional value in the position entry in the positional output area
Step 110—Store the motion command in the logic entry in the logic output area
Step 111—Store the "another" command in the logic entry in the logic output area
Decision Point 112—If there is more command token in the command line, then branch at "Yes" to Step 102; if not, branch at "No" to Decision Point 113
Decision Point 113—If there is more command line in the program file, then branch at "Yes' to Step 100; if not, branch at "No" to Step 114
Step 114—Close the original NC program file 58
Step 115—Create the output robot program file 62 and open it
Step 116—Write the header directive for the logic statements
Step 117—Write all logic output entries into the file
Step 118—Write the header directive for the positional output
Step 119—Write all positional output entries into the file
Step 120—Close the output file
Step 121—De-allocate all logic and positional output entries
Step 122—End Regarding the positional representations, such NC programs are typically created on an offline programming system. Traditionally, the positions in the NC programs are given in the form of absolute position value in each moving joint/axis. On a typical machine tool, the moving joints are aligned according to the Cartesian coordinates, and the value of each such joint is given in X, Y, Z, etc. Due to the complex nature of the axis configuration, calculating the joint angles of the robot axes is sometimes more difficult for the offline programming system than calculating the positional value in the Cartesian coordinate frame.

The proposed method may use the XYZWPR positional representation in the NC program 58, in addition to the joint representation. With the XYZWPR positional representation, it is necessary to specify the configuration "Config" value in addition to the positional value. It is necessary to identify a unique joint value for the given XYZWPR position. In the proposed method, the "Config" value is presented as a comment string indicated by "C" (config) code. For example, a positional value in XYZWPR representation can be given in the following format:

X123.00Y-234.56Z345.03W179.34P-178.34R0.234C(N, L,0,1,-1)

Because the position is defined as the position of the tool center point (TCP) of the robot 30 with the XYZWPR positional representation, it is necessary to specify the frame of reference for each position. In the proposed method, it is done by the special M-code in the program that selects the user frame or the user tool frame.

EXAMPLES

M23T01—To set the User Frame to be #1
M24T02—To set the User Tool Frame to be #2

Some of the M-codes (Miscellaneous code) are defined for the specific machine tool for the specific application requirement. It is often accompanied by an argument specified by a T-code. In order to accomplish the flexibility of such special processing, the proposed method generates a call to the sub-program 64 for each M-code specified. For example, the NC program 58 has an "M08T02" code, and the converted robot program 62 has the "CALL" command, such as "CALL M08 (2)". Also note the argument T02 is passed as the integer parameter to the sub-program "M08".

A miscellaneous code can be specified associated with a motion. In such cases, a "CALL" command is attached to a motion in the converted robot program 62, which command takes place at the timing the robot reaches the specified destination point, with an offset that the timing can be adjusted either earlier or later by specifying the timing offset (in milliseconds).

Figure 8:
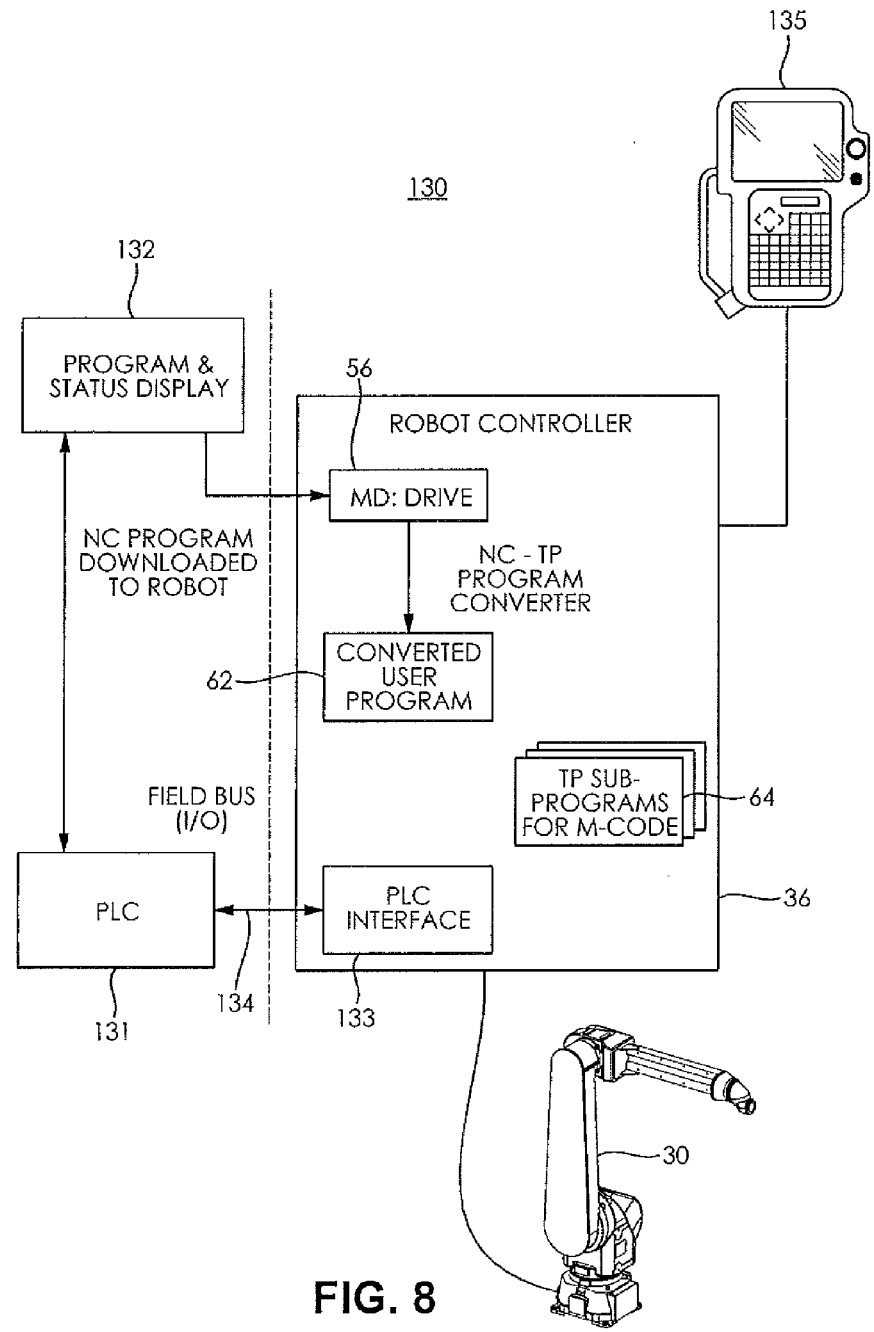
FIG. 8 is a block diagram of the control system for the CNC machine tool shown in FIG. 1 modified to operate the robot controlled machine tool shown in FIG. 2.

There is shown in FIG. 8 a block diagram of a control system 130 for the CNC machine tool 10 shown in FIG. 1 modified to operate the robot controlled machine tool 30 shown in FIG. 2. The CNC machine tool 10 is controlled by a dedicated PLC (programmable logic controller) 131 connected to a display device 132 for displaying to the operator program and status information. The PLC 131 is representative of any device capable of running the NC program for operating the CNC machine tool 10. Further, the PLC 131 is optional if the CNC machine can run the NC program.

The robot controlled machine tool 30 is connected to the robot controller 36 for control according to the converted user program 62 (FIG. 3). The PLC 131 is connected to a PLC interface 133 in the robot controller 36 by a field bus 134 for exchanging signals to provide program control and status monitoring. The NC program is downloaded from the PLC 131 to the MD drive 56 (FIG. 3) in the robot controller 36. The robot controller 36 converts the NC program to the converted user program 62 in TP language and generates the TP subprograms for the M-codes 64 (FIG. 3). Then the robot controller 36 is ready to operate the robot controlled machine tool 30 to perform the manufacturing process embodied in the NC program. A teach pendant 135 is connected to the robot controller 36 to enable the operator to perform all of the functions normally associated with controlling a robot.

In accordance with the provisions of the patent statutes, the present invention has been described in what is considered to represent its preferred embodiment. However, it should be noted that the invention can be practiced otherwise than as specifically illustrated and described without departing from its spirit or scope.

What is claimed is:

1. A method for controlling a robot comprising the steps of:
    storing a numerical control language program in a mass storage device connected to a central processing unit, the numerical control language program adapted to be executed by a computer numerical control machine tool to perform a manufacturing process;
    operating the central processing unit to convert the numerical control language program into a robot language program based upon a pre-defined conversion configuration table having discrete configuration instructions for converting each numerical control language positional command to a robot language positional command and converting each numerical control language miscellaneous code command to a robot language sub-program;
    storing the robot language positional commands and the robot language sub-programs as the robot language program in the mass storage device; and
    executing the robot language program with a robot controller connected to the mass storage device and the robot at a run-time of the robot to perform the manufacturing process.

2. The method according to claim 1 including storing a control program in a control program memory of the robot controller and performing the step of converting utilizing the control program.

3. The method according to claim 1 including providing an XML file of conversion rules in the mass storage device and operating the central processing unit to create the conversion configuration table from the XML file, the conversion configuration table containing rules for converting the numerical control language program into the robot language program.

4. The method according to claim 1 including performing the step of converting to provide a one-to-one correspondence between instruction lines of the robot language program and instruction lines of the numerical control language program.

5. The method according to claim 1 wherein the step of operating includes:
    opening the numerical control language program stored in the mass storage device;
    determining a type for each command line in the numerical control language program;
    allocating an entry in a logic output area or a positional output area based upon the type of command line; and
    closing the numerical control language program.

6. The method according to claim 5 including:
    creating a robot program file;
    writing a header directive for logic entries into the robot program file;
    writing all logic entries from the logic output area to the robot program file;
    writing a header directive for the positional entries into the robot program file;
    writing all positional entries from the positional output area to the robot program file;
    close the robot program file; and
    de-allocate all of the logic and positional entries.

7. The method according to claim 1 including adding a unique positional value to an XYZWPR position representation described in the numerical control language program to generate a corresponding robot language position command.

8. The method according to claim 7 wherein a unique configuration value in the position representation is presented as a comment string.

9. The method according to claim 1 including a timing offset associated with one of the miscellaneous codes relative to arrival of the robot at a destination point.

10. The method according to claim 1 including inserting a special miscellaneous code prior to one of the robot language position commands to select one of a user frame and a user tool frame.

11. The method according to claim 1 inserting a special miscellaneous code prior to one of the robot language position commands to select a robot motion type.

12. A system for controlling a robot based upon a numerical control language program comprising:
    a robot;
    a robot controller connected to the robot for controlling the robot according to a robot language program;
    a mass storage device connected to the robot controller for storing the numerical control language program; and
    a control program executed by the robot controller for converting the numerical control language program into the robot language program based upon a pre-defined conversion configuration table having discrete configuration instructions for converting each numerical control language positional command to a robot language positional command and converting each numerical control language miscellaneous code command to a robot language sub-program.

13. The system according to claim 12 wherein the mass storage device stores the robot language program in a robot program file and stores the robot language sub-programs separate from the robot language program.

14. The system according to claim 12 wherein the mass storage device stores an XML file of conversion rules for creating a conversion configuration table containing rules for converting the numerical control language program into the robot language program.

15. The system according to claim 12 including a display device connected to the robot controller, for displaying instruction lines of the numerical control language program and the robot language program.

16. The system according to claim 12 wherein the robot controller includes a PLC interface for communication with a programmable logic controller.

17. A method for controlling a robot comprising the steps of:

storing a numerical control language program in a mass storage device connected to a central processing unit, the numerical control language program adapted to be executed by a computer numerical control machine tool to perform a manufacturing process;

operating the central processing unit to convert the numerical control language program into a robot language program based upon a pre-defined conversion configuration table having discrete configuration instructions for converting each numerical control language positional command to a robot language positional command and converting each numerical control language miscellaneous code command to a robot language sub-program, further including opening the numerical control language program stored in the mass storage device, allocating an output area of the mass storage device for logic statements, allocating an output area of the mass storage device for positions;

reading a command line from the numerical control language program, creating an entry in the logic output area for the commend line;

fetch from the command line a token and an argument string that follows the token, search for a token letter associated with the token in the conversion configuration table, and determine a type for the command line based upon data in the conversion configuration table;

storing the robot language positional commands and the robot language sub-programs as the robot language program in the mass storage device; and executing the robot language program with a robot controller connected to the mass storage device and the robot at a run-time of the robot to perform the manufacturing process.

18. The method according to claim 17 wherein if the command line is a preparatory type command, motion characteristics based upon the command line argument string are stored.

19. The method according to claim 17 wherein if the command line is a positional type command, allocate an entry in the positional output area.

20. The method according to claim 17 wherein if the command line is a valid another type command other than a preparatory type command or a positional type command, store the another type command as an entry in the logic output area.

* * * * *